(12) United States Patent
Wang (10) Patent No.: US 12,157,635 B2
(45) Date of Patent: Dec. 3, 2024

(54) ROBOT AND POSITIONING METHOD

(71) Applicant: BEIJING GEEKPLUS TECHNOLOGY CO., LTD., Beijing (CN)

(72) Inventor: Huapei Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/256,223

(22) PCT Filed: Nov. 24, 2021

(86) PCT No.: PCT/CN2021/132787
§ 371 (c)(1),
(2) Date: Jun. 7, 2023

(87) PCT Pub. No.: WO2022/127541
PCT Pub. Date: Jun. 23, 2022

(65) Prior Publication Data
US 2024/0017924 A1    Jan. 18, 2024

(30) Foreign Application Priority Data

Dec. 16, 2020  (CN) .......................... 202011487913.2

(51) Int. Cl.
*B25J 9/00* (2006.01)
*B65G 1/137* (2006.01)

(52) U.S. Cl.
CPC .................. *B65G 1/1375* (2013.01)

(58) Field of Classification Search
CPC .... B65G 1/1375; G05D 1/2446; G05D 1/646; G05B 19/41895; B25J 9/1679;
(Continued)

(56) References Cited

U.S. PATENT DOCUMENTS

| 8,352,124 B2 * | 1/2013 | Taguchi ............... B62D 15/025 180/443 |
| 10,121,367 B2 * | 11/2018 | Jammoussi ............. G06T 11/60 |

(Continued)

FOREIGN PATENT DOCUMENTS

| CN | 102902271 | 1/2013 |
| CN | 107861509 | 3/2018 |

(Continued)

OTHER PUBLICATIONS

CNIPA, Notification to Grant Patent Right for CN Application No. 202011487913.2, Jan. 29, 2024.
(Continued)

*Primary Examiner* — Patrick H Mackey
(74) *Attorney, Agent, or Firm* — Hodgson Russ LLP (57) ABSTRACT

A robot includes: an identifying component, configured to, when detecting positioning reference objects on both sides of the robot during movement of the robot, obtain distance information between the identifying component and the positioning reference object on each side, respectively, and send the distance information to the robot processor, a positioning component, configured to obtain first location information when the identifying component identifies the positioning reference objects, and send the first location information to the robot processor; and a robot processor, configured to determine middle position information between the positioning reference objects based on the distance information to the positioning reference object on each side and the first location information; determine a motion control parameter based on the middle position information and the first location information; and control, based on the motion control parameter, the robot to move along a middle position between the positioning reference objects.

6 Claims, 4 Drawing Sheets

(58) Field of Classification Search
CPC . B25J 9/00; B25J 9/1664; B25J 9/1669; B25J 9/1697; B25J 13/00; B25J 13/089; B25J 13/08

See application file for complete search history.

(56) References Cited

U.S. PATENT DOCUMENTS

| | | | | |
|---|---|---|---|---|
| 11,119,491 | B2* | 9/2021 | Jammoussi | B62D 15/025 |
| 11,161,507 | B2* | 11/2021 | Yue | B62D 6/00 |
| 11,214,299 | B2* | 1/2022 | Shiraishi | B62D 6/00 |
| 2019/0160675 | A1 | 5/2019 | Paschall, II et al. | |
| 2020/0110410 | A1* | 4/2020 | Murai | G05D 1/0088 |
| 2020/0156700 | A1 | 5/2020 | Shiraishi et al. | |
| 2022/0135031 | A1* | 5/2022 | Oniwa | B62D 15/025 701/41 |

FOREIGN PATENT DOCUMENTS

| | | |
|---|---|---|
| CN | 107992054 | 5/2018 |
| CN | 109765901 | 5/2019 |
| CN | 110231816 | 9/2019 |
| CN | 110455272 | 11/2019 |
| CN | 111990929 | 11/2020 |
| DE | 102017120218 | 3/2019 |
| JP | H05257530 | 10/1993 |
| JP | 2001088906 | 4/2001 |
| JP | 2002108452 | 4/2002 |
| JP | 2002296010 | 10/2002 |
| JP | 2009129058 | 6/2009 |
| JP | 2014219960 | 11/2014 |
| JP | 2016152004 | 8/2016 |
| JP | 2018112830 | 7/2018 |
| JP | 2019021156 | 2/2019 |
| WO | WO-2018035482 A1 * | 2/2018 |

OTHER PUBLICATIONS

CNIPA, First Office Action for CN Application No. 202011487913.2, May 13, 2023.
WIPO, International Search Report and Written Opinion for PCT/CN2021/132787, Jan. 27, 2022.
KIPO, Office Action for KR Application No. 10-2023-7020603, Jun. 12, 2024.
JPO, Office Action for JP Application No. 2023-534990, Jun. 11, 2024.
EPO, Extended European Search Report for EP Application No. 21905470.7, Sep. 9, 2024.

* cited by examiner

ROBOT AND POSITIONING METHOD

CROSS-REFERENCE TO RELATED APPLICATIONS

This application is a U.S. national phase entry of International Application No. PCT/CN2021/132787, filed on Nov. 24, 2021, which claims priority to Chinese Patent Application No. 2020114879132, filed on Dec. 16, 2020, the entire disclosures of which are incorporated herein by reference.

TECHNICAL FIELD

The disclosure relates to the field of robotics, in particular to a robot and a positioning method.

BACKGROUND

With the rapid development of intelligent warehouse systems, robots have begun to be widely used in various intelligent warehouse systems, to improve the efficiency of goods flow. According to different goods transportation needs, the types of robots are diversified, and different kinds of robots are used in different goods transportation scenarios. In order to ensure the safety of transportation process and the accuracy of delivery results, the robots need to be positioned in the process of transporting goods using the robots, and the integrity of transportation process is ensured by the positioning information.

Currently, the robots in the intelligent warehouse systems are generally positioned based on the locations of the QR codes deployed on the floor of the storage space. By equipping the identifying cameras on the robots, during the motion of the robot, the QR codes deployed on the floor of the storage space are scanned by the identifying cameras to obtain QR code information, and the positioning information is obtained according to the QR code information.

SUMMARY

According to a first aspect of the embodiment of the disclosure, a robot is provided. The robot includes: a robot processor, an identifying component and a positioning component.

The identifying component is configured to, in response to detecting positioning reference objects on both sides of the robot during movement of the robot, obtain distance information between the identifying component and the positioning reference object on each side, respectively, and send the distance information to the robot processor.

The positioning component is configured to obtain first location information in a case that the identifying component identifies the positioning reference objects, and send the first location information to the robot processor.

The robot processor is configured to determine middle position information between the positioning reference objects on both sides based on the received distance information to the positioning reference object on each side and the first location information, middle position information between the positioning reference objects on both sides; determine a motion control parameter based on the middle position information and the first location information; and control, based on the motion control parameter, the robot to move according to the middle position information.

According to a second aspect of the embodiment of the disclosure, a positioning method is provided. The method includes:

identifying, by an identifying component, positioning reference objects on both sides during movement, and obtaining distance information to the positioning reference object on each side respectively;

in response to identifying the positioning reference objects, obtaining first location information;

determining middle position information between the positioning reference objects on both sides based on the distance information to the positioning reference object on each side and the first location information;

determining a motion control parameter based on the middle position information and the first location information; and controlling, based on the motion control parameter, a robot to move according to the middle position information.

According to a third aspect of the embodiment of the disclosure, a warehouse system is provided. The warehouse system includes: the above robot, a control server and positioning reference objects disposed in a storage space;

the control server is configured to determine, in response to a received goods transfer request, a target robot to perform a goods transfer operation based on shelf location information and goods box location information carried in the goods transfer request, and send a control command to the target robot; and the target robot is configured to receive the control command, and move between shelves in the warehouse system based on middle position information between determined positioning reference objects on both sides in response to the control command.

In order to make the above-mentioned objects, features and advantages of the disclosure more obvious and understandable, the following is a detailed description of the preferred embodiments with reference to the accompanying drawings.

BRIEF DESCRIPTION OF THE DRAWINGS

In order to clear illustrate the technical solution of the embodiments of the disclosure, a brief description of the accompanying drawings required for use in the embodiments is presented below. The accompanying drawings, which are incorporated in and constitute a part of this specification, illustrate embodiments consistent with the disclosure and, together with the description, serve to explain the technical solutions of the disclosure. It should be understood that the following accompanying drawings illustrate only some embodiments of the disclosure and therefore should not be regarded as limiting the scope, and for those skilled in the art, other related drawings may be obtained from these drawings without inventive works.

DETAILED DESCRIPTION

To make the purposes, technical solutions and advantages of the embodiments of the disclosure clearer, a clear and complete description of the technical solutions in the embodiments of the disclosure is set forth below with reference to the accompanying drawings in the embodiments of the disclosure. Obviously, the embodiments described are only a portion of the embodiments of the disclosure, and not all of them. The components of the embodiments of the disclosure generally described and illustrated herein can be arranged and designed in a variety of different configurations. Therefore, the following detailed description of the embodiments of the disclosure is not intended to limit the protection scope of the disclosure, but merely indicate selected embodiments of the disclosure. Based on the embodiments of the disclosure, all other embodiments obtained by those skilled in the art without inventive works are within the scope of protection of the disclosure.

In addition, the terms "first", "second", etc. in specification, claims and the above accompanying drawings of the embodiments of the disclosure are used to distinguish similar objects, which do not indicate a particular order or sequence. It should be understood that the data used in this way may be interchanged in appropriate circumstances, so that the embodiments described herein can be implemented in an order other than the orders illustrated or described herein.

The term of "a plurality of or several" mentioned herein refers to two or more. The term of "and/or" describes the association relation between associated objects, which indicates three relations, e.g., "A and/or B" may indicate: A exists alone, A and B both exist, and B exists alone. The character "/" generally indicates that the associated objects prior to and after the character "/" is in an "or" relation.

It is found that in an intelligent warehouse system, in order to ensure the safety of the robot moving between shelves and the accuracy of picking up boxes, it is necessary to deploy QR codes at the ground locations corresponding to the boxes, and the robot obtains location information by identifying the QR code information on the ground, and further achieves free transfer between the shelves according to the obtained location information. However, in the case of dense placement of goods boxes, the number of QR codes to be deployed increased, and the spacing between the QR codes becomes smaller, which increases the identification difficulty of the robot, and increases the possibility of identification errors and the costs of QR code deployment and maintenance. When multiple robots moves between shelves, there may be a situation that the robots queue up to identify the QR code information, which reduces the efficiency and timeliness of goods transportation.

Based on the above research, the disclosure provides a robot and a positioning method. An identifying component obtains distance information corresponding to positioning reference object on each side, middle position information is determined based on obtained first location information, and a motion control parameter is determined based on the determined middle position information, to realize the method for controlling a robot to move along a middle position, which saves the deployment and maintenance costs of the QR codes. In this way, when multiple robots move between the shelves, the robots may not interfere each other in obtaining the motion information, thereby improving the efficiency and timeliness of goods transportation.

Since the defects for the above solutions are all the results of practice and careful study of the inventors, the process of discovery of the above problems and the solutions proposed in the disclosure below for the above problems should be considered as the inventor's contribution to the disclosure in the course of the disclosure.

It should be noted that similar symbols and letters indicate similar items in the accompanying drawings below, so that once an item is defined in an accompanying drawing, it does not need be further defined and explained in subsequent accompanying drawings.

Figure 1:
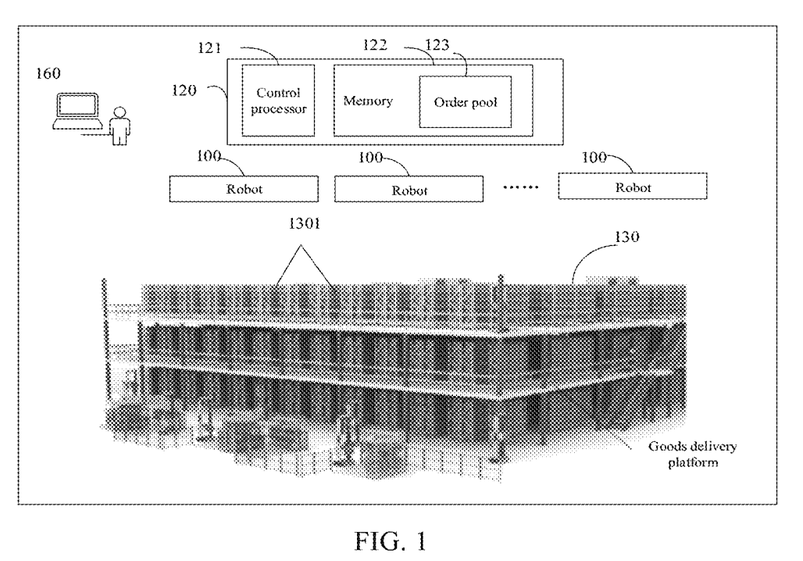
FIG. 1 is a schematic diagram of a warehouse system according to an embodiment of the disclosure.

To facilitate understanding of the embodiments of the disclosure, an application scenario of the robot provided by the embodiments of the disclosure are described firstly. The robot provided by the embodiments of the disclosure can be applied in a warehouse system as shown in FIG. 1. The warehouse system includes: a control server 120, a robot 100, and a storage space 130. The number of robots can be set as one or more, and the specific number is determined by the number of goods to be delivered. The robot is used to transfer the goods to be delivered in the storage space. The robot can be a shelf robot for transferring shelves in the storage space 130, and can also be a goods-box robot for transferring storage containers (e.g., goods boxes) used for picking up and storing goods from the shelves. In some embodiments, the storage space 130 is provided with multiple shelves 1301 for storing inventory items (which may be ordinary shelves, or pallet shelves), and the inventory items are placed on the shelves 1301. When responding to an order task, the item may be picked into an order container, which may be at least associated with one order. Generally, multiple workstations may be provided on one side of the storage space 130. In a goods picking scenario, the workstations may also be referred to as picking stations. In a goods replenishment scenario, the workstations may also be referred to as replenishment stations. As a possible implementation, the picking stations and replenishment stations may be multiplexed.

The control server 120 is a software system running on a server and having data storage and information processing capabilities, and can be connected wirelessly or wired to the robots, hardware input systems, and other software systems. The control server 120 may include one or more servers and may be a centralized control architecture or a distributed computing architecture. The control server 120 includes a control processor 121 and a memory 122, and there may be an order pool 123 in the memory 122.

It is noted that the control server 120 communicates wirelessly with the robots 100, and the staff can make the control server 120 operate through an operation desk 160, and the robots 100, under the control of the control server 120, can travel along the empty space in the shelf array composed of the shelves, to further perform the corresponding task.

Figure 2A:
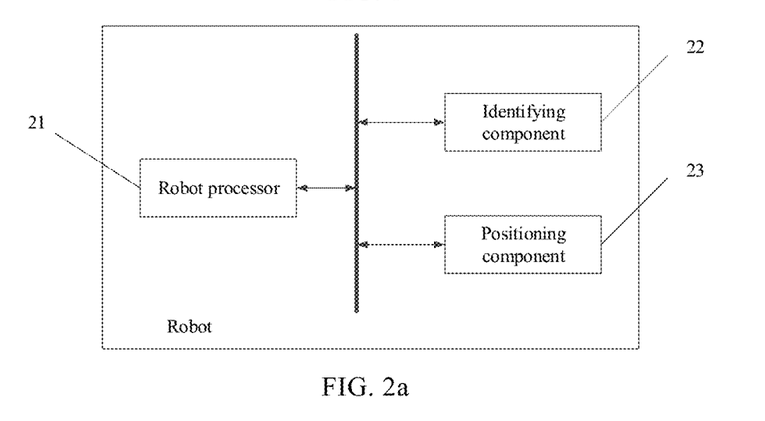
FIG. 2a is a block diagram of a robot according to an embodiment of the disclosure.

Based on the aforementioned warehouse system, the embodiments of the disclosure also provide a robot applied to the aforementioned warehouse system. FIG. 2a is a block diagram of a robot according to an embodiment of the disclosure. The robot includes: a robot processor 21, an identifying component 22, and a positioning component 23.

The identifying component 22 is configured to, in response to detecting positioning reference objects on both sides of the robot during movement of the robot, obtain distance information between the identifying component and the positioning reference object on each side, respectively, and send the distance information to the robot processor 21.

In a specific implementation, when the control server receives a goods transfer request from an upstream system, the control server determines a robot for performing a goods transfer operation based on a shelf location and goods box location information carried in the goods transfer request, and sends a control command to the robot. The robot processor 21 controls the robot to start moving between the shelves in the warehouse system according to the received control command. During the process of moving between the shelves, the identifying component 22 mounted on the robot starts detecting the positioning reference objects on both sides, and, the distance information to the identified positioning reference object on each side can be obtained when the identifying component 22 detects the positioning reference objects on both sides and can be sent to the robot processor 21.

The positioning component 23 is configured to obtain, in a case that the identifying component 22 identifies the positioning reference objects, first location information and send it to the robot processor 21.

In an implementation, in the case where the identifying component 22 mounted on the robot detects the positioning reference objects on both sides, the positioning component 23 mounted on the robot positions a first location where it is currently located and sends the first location information including the first location obtained through the positioning to the robot processor 21. It is noted that the first location information may be location information of a center of the robot. In another implementation, the positioning component 23 mounted on the robot keeps positioning itself during it movement, and sends the location information obtained to the robot processor 21. When the identifying component 22 detects the positioning reference objects on both sides, the robot processor 21 updates the latest received location information to the first location information.

The robot processor 21 is configured to determine, based on the received distance information to the positioning reference object on each side and the first location information, middle position information between the positioning reference objects on both sides; determine a motion control parameter based on the middle position information and the first location information; and control the robot to move along a middle position between the positioning reference objects on both sides based on the motion control parameter.

In a specific implementation, the robot processor 21 can determine the middle position information between the positioning reference objects on both sides based on the distance information to the positioning reference object on each side received from the identifying component 22 and the first location information sent by the positioning component 23. It is noted that the processes of determining the middle position information are different depending on the set types of the identifying component 22.

In an implementation, the identifying component 22 includes a laser component, configured to emit detection laser to both sides based on preset angle information; and the robot processor 21 is configured to: determine reference location information corresponding to the positioning reference object on each side based on the distance information, the preset angle information and the first location information; and determine the middle position information between the positioning reference objects on both sides based on the reference location information corresponding to the positioning reference object on each side.

Figure 2B:
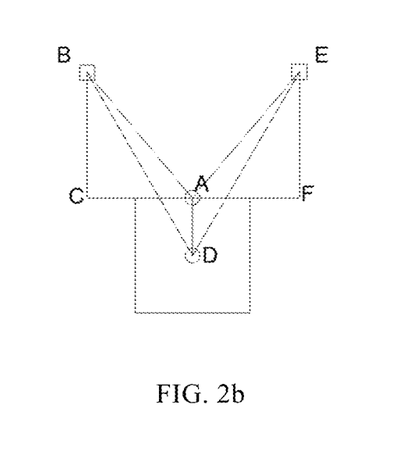
FIG. 2b is a schematic diagram of a laser component as an identifying component according to an embodiment of the disclosure.

FIG. 2b is a schematic diagram of a laser component as an identifying component according to an embodiment of the disclosure. For example, the laser component can be fixedly installed at the front end of the robot and has a fixed distance from the center of the robot, and a certain angle is set during the installation to ensure that the laser component can emit detection laser to both sides according to the preset angle information. The preset angle information may include the first angle information and the second angle information. In a specific implementation, point A is a location of the laser component, point B and point E are the locations of the positioning reference objects on both sides, and point D is the center position of the robot.

The angle information of the laser component for emitting the detection laser and the distance information between the laser component and the center of the robot can be stored as robot installation parameters in a memory, such that the robot processor 21 can read the angle information of the detection laser and the distance information between the laser component and the center of the robot from the memory when needed.

In the process of movement of the robot, the laser component emits the detection laser to both sides according to the preset angle information to identify the positioning reference objects on both sides. When identifying the positioning reference objects on both sides, the robot processor obtains the installation parameters stored in the memory and including the distance information between the laser component and the center of the robot and the angle information of the detection laser emitted by the laser component. The angle information includes the first angle information and the second angle information. The first distance information AB between the laser component that emits the detection laser and the first positioning reference object (point B) is obtained. A plane coordinate system is established with the first location information received by the robot processor from the positioning component, i.e., the information of the middle position of the robot, as the origin, and with a direction in which the robot head travels as the positive Y-axis direction. In the plane coordinate system, a coordinate location of the laser component can be determined based on the distance information between the laser component and the middle position of the robot and the middle position of the robot, i.e., the location information of the laser component is determined. The second location information of the first positioning reference object (point B) can be determined based on the first distance information AB and the first angle information ∠BAC. In addition, the second angle information and the second distance information AE from the second positioning reference object (point E) are recorded when the laser component identifies the second positioning reference object through the detection laser emitted according to the second angle information. In the established plane coordinate system, the third location information of the second positioning reference object (point E) can be determined based on the second distance information AE and the second angle information ∠EAF.

The robot processor may determine the middle position information between the first positioning reference object and the second positioning reference object based on the coordinates of the second location information and the third location information in the X-axis. On the basis, the robot processor determines a deviation distance and a deviation angle between the two locations based on the determined coordinates of the middle position information and the coordinates of the received first location information, and determines the motion control parameter of the robot based on the determined deviation distance and the deviation angle. For example, the motion control parameter may include moving directions and moving distances.

In a specific implementation, the robot processor determines a moving direction of the robot on a horizontal axis based on a difference between a horizontal coordinate of the first location information and a horizontal coordinate of the determined middle position information; and determine a moving distance of the robot on the X-axis based on an absolute value of the difference between the horizontal coordinate of the first location information and the horizontal coordinate of the middle position information.

When determining the moving direction of the robot on the X-axis, in an embodiment, a direction obtained by rotating the positive direction of the Y-axis of the robot in a clockwise direction by ninety degrees is determined as the positive direction of the X-axis. If the difference determined by the robot processor by subtracting the horizontal coordinate of the determined middle position information from the horizontal coordinate of the first location information is negative, the moving direction of the robot on the X-axis is determined to be to the right. Instead, if the determined difference is positive, the moving direction of the robot on the X-axis is determined to be to the left. If the difference determined by the robot processor by subtracting the horizontal coordinate of the first location information from the horizontal coordinate of the determined middle position information is positive, the moving direction of the robot on the X-axis is determined to be to the right. Instead, if the determined difference is negative, the moving direction of the robot on the X-axis is determined to be to the left.

In another embodiment, a direction obtained by rotating the positive direction of the Y-axis of the robot in a counterclockwise direction by ninety degrees is determined as the positive direction of the X-axis. If the difference determined by the robot processor by subtracting the horizontal coordinate of the determined middle position information from the horizontal coordinate of the first location information is negative, the moving direction of the robot on the X-axis is determined to be to the left. Instead, if the determined difference is positive, the moving direction of the robot on the X-axis is determined to be to the right. If the difference determined by the robot processor by subtracting the horizontal coordinate of the first location information from the horizontal coordinate of the determined middle position information is positive, the moving direction of the robot on the X-axis is determined to be to the left. Instead, if the determined difference is negative, the moving direction of the robot on the X-axis is determined to be to the right. The above-mentioned ways of setting the positive direction of the X-axis are not limited in the embodiments of the disclosure.

The robot processor determines a moving distance and a moving direction of the robot on a vertical axis based on the difference between the vertical coordinate of the first location information and the vertical coordinate of the middle position information. It should be noted that the moving distance of the robot on the Y-axis is determined based on an absolute value of a difference between a vertical coordinate of the first location information and a vertical coordinate of the determined middle position information. When determining the moving direction of the robot on the Y-axis, since the laser component is mounted at the front end of the robot, the moving direction of the robot on the vertical axis is along the positive direction of the Y-axis.

The robot processor controls, based on the determined moving distances and moving directions of the robot in the X-axis and Y-axis as described above, the robot to move according to the middle position information. In a specific implementation, the robot processor can control the robot to rotate on the X-axis according to the determined moving direction on the X-axis, and then to move on the X-axis according to the determined moving distance on the X-axis after completing the rotation on the X-axis. After reaching the moving distance, the robot rotates to the positive direction of the Y-axis and moves according to the determined moving distance on the Y-axis, and moves to the determined middle position. In addition, the robot can be controlled to move in the positive direction of the Y-axis according to the determined moving distance on the Y-axis, and after reaching the moving distance, the robot can be controlled to rotate on the X-axis according to the determined moving direction on the X-axis. After completing the rotation on the X-axis, the robot can move on the X-axis according to the determined moving distance on the X-axis and move to the determined middle position. In another implementation, the robot processor can also determine a rotation angle and a moving distance of the robot during the movement of the robot based on the determined moving direction and moving distance on the X-axis and the moving distance and moving direction on the Y-axis, and control the robot to move to the determined middle position by controlling a moving speed of the robot. It should be noted that after determining one middle position, the robot can determine a series of middle positions of the positioning reference objects on both sides in the same way, to generate a middle line between the positioning reference objects on both sides. The robot processor controls the robot to move along the middle line, thereby ensuring that the robot can achieve moving at the middle between the positioning reference objects on both sides.

Figure 2C:
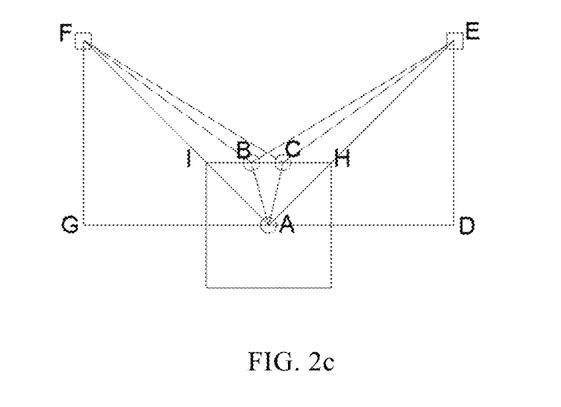
FIG. 2c is a schematic diagram of a binocular camera component as an identifying component according to an embodiment of the disclosure.

In an implementation, the identifying component further includes: a binocular camera component, and the binocular camera component includes a first camera component and a second camera component. The obtained distance information includes third distance information between the first camera component and a first positioning reference object, fourth distance information between the second camera component and the first positioning reference object, fifth distance information between the first camera component and a second positioning reference object, and sixth distance information between the second camera component and the second positioning reference object.

FIG. 2c is a schematic diagram of a binocular camera component as an identifying component according to an embodiment of the disclosure. In a specific implementation, the binocular camera component is fixedly mounted on the same horizontal line at the front end of the robot and has a fixed seventh distance information BC. The first camera component of the binocular camera component is located at location point C, the second camera component of the binocular camera component is located at location point B, and the first camera component and the second camera component of the binocular camera component are respectively at a certain angle to the center location of the robot, i.e., $\angle CAD$ and $\angle BAG$ respectively. In addition, the first camera component has a fixed eighth distance information AC from the center location of the robot, and the second camera component has a fixed ninth distance information AB from the center location of the robot, in which the seventh distance information, the eighth distance information and the ninth distance information may be determined based on the installation parameters obtained in the memory. Point A is the center location of the robot, the location of point C is the location of the first camera component, the location of point B is the location of the second camera component, point E is a location of the identified first positioning reference object, and point F is a location of the identified second positioning reference object. In the process of movement of the robot, the binocular camera component takes pictures at both sides to identify the positioning reference objects on both sides. In a case where the positioning reference objects on both sides are recognized, the robot processor records the third distance information EC between the first camera component and the first positioning reference object, the fourth distance information EB between the second camera component and the first positioning reference object, the fifth distance information FC between the first camera component and the second positioning reference object, and the sixth distance information FB between the second camera component and the second positioning reference object. Based on the third distance information EC, the fourth distance information EB, and the seventh distance information BC between the first camera component and the second camera component, the value of $\angle ECB$ is determined using the cosine theorem, and the value of $\angle ECH$ can be determined based on the value of $\angle ECB$. The value of $\angle ACB$ can be determined based on the seventh distance information BC between the first camera component and the second camera component, the eighth distance information AC between the first camera component and the center of the robot, and the ninth distance information AB between the second camera and the center of the robot. The value of $\angle ACH$ can be determined based on the value of $\angle ACB$, and the value of $\angle ACE$ can be determined based on the value of $\angle ACH$ and the value of $\angle ECH$. The value of the tenth distance information AE can be determined based on the value of $\angle ACE$ and the value of the distance information AC and the third distance information EC, further the value of $\angle CAE$ is determined. Further, the value of the third angle information $\angle EAD$ is determined based on the value of $\angle CAD$. The fourth location information of the first posing reference object can be determined based on an established plane coordinate system. In a specific implementation, the plane coordinate system is established using the center point A of the robot as the origin and using a travel direction of the robot head as the positive direction of the Y axis. The fourth coordinate location of the first positioning reference object can be determined based on the above steps. In addition, the robot processor can determine the value of $\angle FBC$ based on the fifth distance information FC, the sixth distance information FB, and the seventh distance information BC between the first camera component and the second camera component using the cosine theorem. The value of $\angle FBI$ can be determined based on the value of $\angle FBC$. The value of $\angle ABC$ is determined based on the seventh distance information BC between the first camera component and the second camera component, the eighth distance information AC between the first camera component and the center of the robot, and the ninth distance information AB between the second camera component and the center of the robot. The value of $\angle ABI$ can be determined based on the value of $\angle ABC$. The value of $\angle ABF$ can be further determined based on the values of $\angle ABI$ and $\angle FBI$. Based on the value of $\angle ABF$, the distance information AB and the sixth distance information FB, the value of the eleventh distance information AF can be determined, and the value of $\angle BAI$ is further determined. The value of the fourth angle information $\angle FAG$ can be determined based on the values of $\angle BAG$ and $\angle BAI$. Further, the fifth location information of the second positioning reference object and its corresponding fifth coordinate location can be determined based on the established plane coordinate system, and then the middle position information between the first positioning reference object and the second positioning reference object can be determined based on the determined fourth location information and the fifth location information.

After determining the middle position between the first positioning reference object and the second positioning reference object according to the method described above, the robot performs the same steps as those described above when the identifying component is the laser component, which are not repeated in the embodiments of the disclosure.

Embodiments of the disclosure provide a method, in which: the locations of the positioning reference objects on both sides of a motion path are identified by means of a pre-set identifying component, the coordinate locations of the identified positioning reference objects on both sides are determined based on the locations of the identified positioning reference objects and the first location information obtained at the current location, the middle position between the positioning reference objects on both sides is determined based on the acquired coordinate locations, and the deviation information between the current location and the middle position is determined, and the motion control parameter is determined based on the deviation information and the robot is controlled to move based on the motion control parameter, thus enabling the robot to move along the middle position between the positioning reference objects on both sides, which saves the deployment and maintenance costs of QR codes and improves the flexibility and adaptability of the robot.

The positioning method provided by the embodiments of the disclosure is described below with an example where the executing subject is a robot.

Figure 3A:
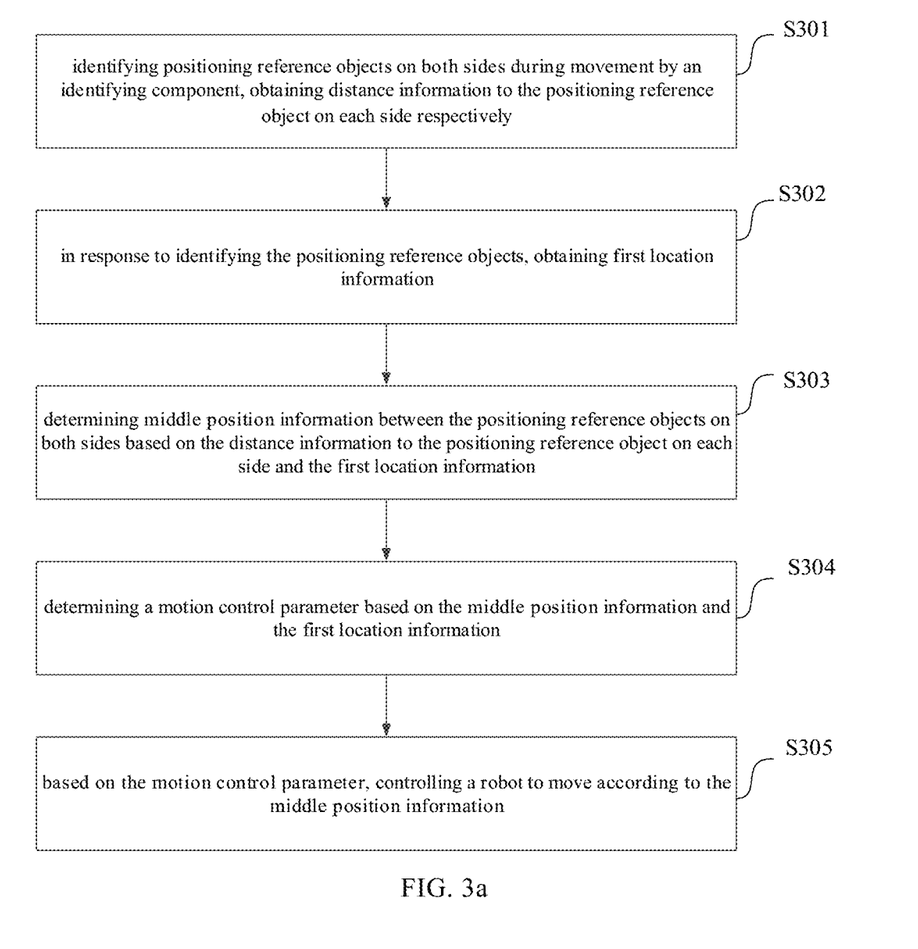
FIG. 3a is a flowchart of a positioning method according to an embodiment of the disclosure.

FIG. 3a is a flowchart of a positioning method according to an embodiment of the disclosure. The method includes the following steps.

At step S301, positioning reference objects on both sides are identified during movement by an identifying component, and distance information to the positioning reference object on each side is obtained respectively.

At this step, a control server receives a goods transfer request from an upstream system, generates a control command according to the goods transfer request, and sends the control command to the robot. The robot starts to move in a warehouse system in response to the received control command, and the identifying component mounted on the robot starts to identify the positioning reference objects on both sides during the process of movement. In the case of identifying the positioning reference objects on both sides, the distance information between the identifying component and the positioning reference object on each side is recorded.

At step S302, in response to identifying the positioning reference objects, first location information is obtained.

At this step, in case that the robot detects that the identifying component identifies the positioning reference objects, the first location information of the current location is obtained.

At step S303, middle position information between the positioning reference objects on both sides is determined based on the distance information to the positioning reference object on each side and the first location information.

At this step, the robot determines reference location information corresponding to the positioning reference object on each side based on the acquired distance information to the positioning reference object on each side and the first location information, and further determine the corresponding middle position information based on the reference location information corresponding to the positioning reference object on both sides.

In an implementation, the identifying component includes: a laser component. The laser component is configured to emit detection laser to both sides based on preset angle information, and identify the positioning reference objects on both sides using the emitted detection laser. In a specific implementation, the distance information includes: first distance information between the laser component and the first positioning reference object, and second distance information between the laser component and the second positioning reference object. The preset angle information includes: first angle information for identifying the first positioning reference object and second angle information for identifying the second positioning reference object. The reference location information includes: second location information of the first positioning reference object and third location information of the second positioning reference object.

The angle information at which the laser component emits the detection laser and the distance information between the laser component and the center of the robot can be stored as the robot installation parameters in the memory, so that the robot processor 21 can read the angle information of the detection laser and the distance information between the laser component and the center of the robot from the memory when needed.

Figure 3B:
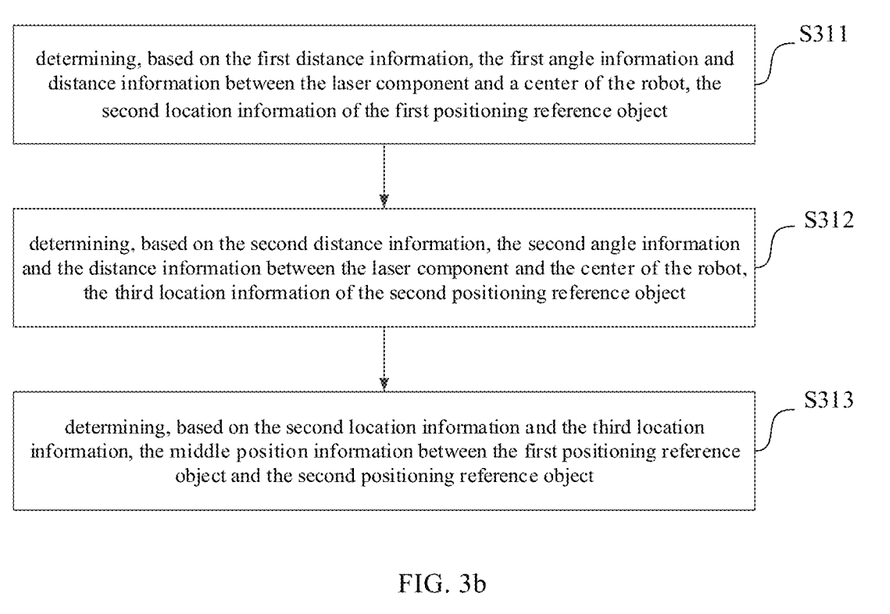
FIG. 3b is a flowchart for determining middle position information between positioning reference objects on both sides by a laser component according to an embodiment of the disclosure.

In a specific implementation, the laser component emits detection laser to the side of the first positioning reference object in accordance with the first angle information and emits detection laser to the side of the second positioning reference object in accordance with the second angle information. After the laser component identifies the positioning reference objects on both sides, the robot processor obtains the installation parameters stored in the memory and including the distance information between the laser component and the center of the robot and the angle information at which the laser component emits the detection laser. The angle information includes: the first angle information and the second angle information. Based on the first angle information, the first distance information when the first positioning reference object is identified, the second angle information, and the second distance information when the second positioning reference object is identified, the middle position information between the positioning reference objects on both sides can be determined according to the following steps. FIG. 3b is a flowchart for determining the middle position information between the positioning reference objects on both sides by a laser component according to an embodiment of the disclosure. The method includes the following steps.

At step S311, based on the first distance information, the first angle information and distance information between the laser component and a center of the robot, the second location information of the first positioning reference object is determined.

In a specific implementation, based on the first distance information between the laser component and the identified first positioning reference object, the first angle information, and the installation parameters including the distance information between the laser component and the center of the robot obtained from the memory, the second location information of the first posing reference object can be determined.

At step S312, based on the second distance information, the second angle information and the distance information between the laser component and the center of the robot, the third location information of the second positioning reference object is determined.

In a specific implementation, based on the second distance information between the laser component and the second positioning reference object identified by the laser component, the preset second angle information, and the installation parameters including the distance information between the laser component and the center of the robot obtained from the memory, the third location information of the second positioning reference object can be determined.

At step S313, based on the second location information and the third location information, the middle position information between the first positioning reference object and the second positioning reference object is determined.

Figure 3C:
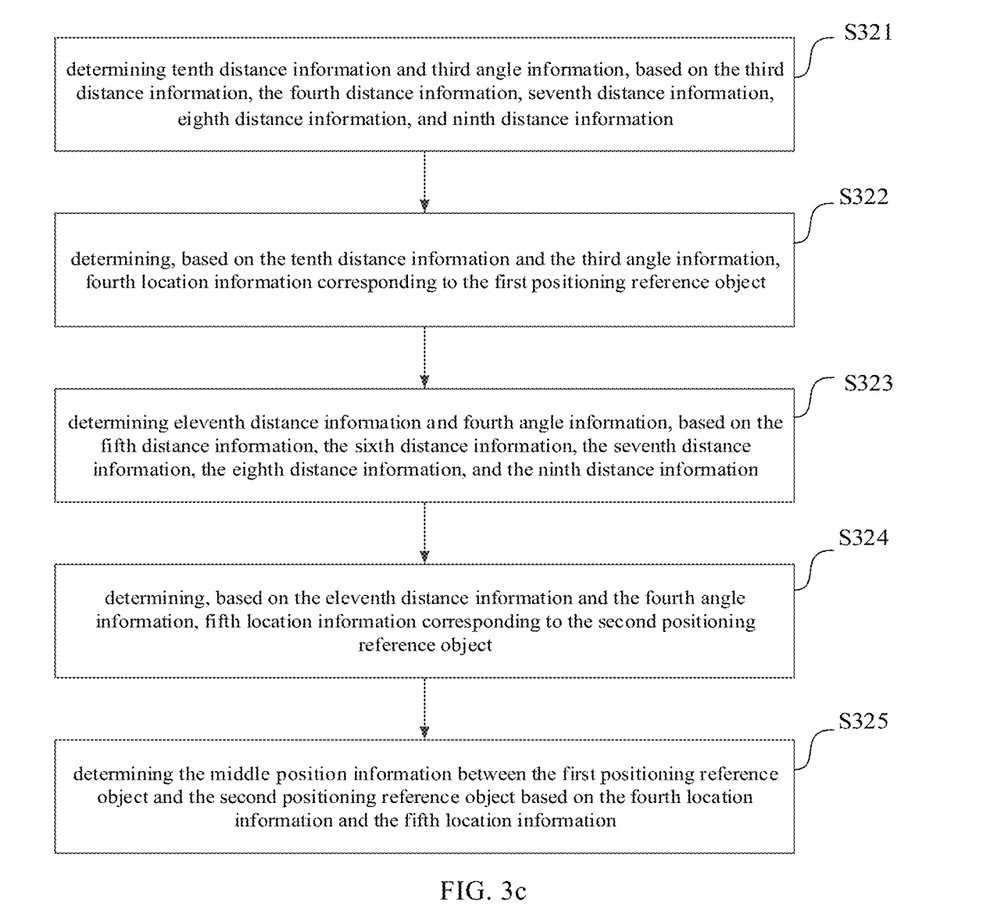
FIG. 3c is a flowchart for determining middle position information between positioning reference objects on both sides by a binocular camera component according to an embodiment of the disclosure.

In another implementation, the identifying component includes: a binocular camera component. The binocular camera component includes a first camera component and a second camera component. The distance information includes third distance information between the first camera component and a first positioning reference object, fourth distance information between the second camera component and the first positioning reference object, fifth distance information between the first camera component and a second positioning reference object, and sixth distance information between the second camera component and the second positioning reference object, seventh distance information between the first camera component and the second camera component, eighth distance information between the first camera component and a center of the robot, and ninth distance information between the second camera component and the center of the robot. The first location corresponding to the first location information is the location of the center of the robot. The middle position information between the positioning reference objects on both sides can be determined in accordance with the following steps. FIG. 3c is a flowchart for determining the middle position information between the positioning reference objects on both sides by a binocular camera component according to an embodiment of the disclosure. The method includes the following steps.

At step S321, tenth distance information and third angle information are determined, based on the third distance information, the fourth distance information, seventh distance information, eighth distance information, and ninth distance information.

The seventh distance information, the eighth distance information and the ninth distance information may be determined based on the installation parameters obtained from the memory, and the tenth distance information is the value of AE in FIG. 2c, and the third angle information is the value of ∠EAD in FIG. 2c.

At step S322, based on the tenth distance information and the third angle information, fourth location information corresponding to the first positioning reference object is determined.

At step S323, eleventh distance information and fourth angle information are determined, based on the fifth distance information, the sixth distance information, the seventh distance information, the eighth distance information, and the ninth distance information.

At this step, the eleventh distance information is the value of AF in FIG. 2c, and the fourth angle information is the value of ∠FAG in FIG. 2c.

At step S324, based on the eleventh distance information and the fourth angle information, fifth location information corresponding to the second positioning reference object is determined.

At step S325, the middle position information between the first positioning reference object and the second positioning reference object is determined based on the fourth location information and the fifth location information.

Based on the above steps, the middle position information between the first positioning reference object and the second positioning reference object can be determined in the case where the identifying component is a binocular camera component.

At step S304, a motion control parameter is determined based on the middle position information and the first location information.

At this step, the robot determines the deviation information of the two locations based on the determined middle position information and the first location information, and determines the motion control parameter of the robot based on the deviation information.

In a specific implementation, the positioning parameter may include moving directions and moving distances. The robot determines a moving distance and a moving direction of the robot in the horizontal axis based on a difference between a horizontal coordinate of the first location information and a horizontal coordinate of the middle position information. It also determines a moving distance and a moving direction of the robot in the vertical axis based on a difference between a vertical coordinate of the first location information and a vertical coordinate of the middle position information.

At step S305, based on the motion control parameter, the robot is controlled to move according to the middle position information.

At this step, the robot is controlled to move toward the middle position based on the determined motion control parameter, and finally move along a middle line between the positioning reference objects on both sides.

It is understood by those skilled in the art that in the above method of a specific implementation, the order in which the steps are written does not imply a strict order of execution that constitutes any limitation to the process of implementation, and that the specific order of execution of the steps should be determined by their function and possible internal logic.

It should be noted that the above described embodiments are only specific embodiments of the disclosure used to illustrate, but are not limit the technical solutions of the disclosure, and the scope of protection of the disclosure is not limited thereto. Although the disclosure is described in detail with reference to the foregoing embodiments, it should be understood by those skilled in the art that any of those skilled in the art, within the scope of the technology disclosed in this disclosure, may still modify or readily conceive of variations to the technical solutions described in the foregoing embodiments, or make equivalent substitutions to some of the technical features thereof. These modifications, changes or substitutions do not take the essence of the corresponding technical solutions out of the spirit and scope of the technical solutions of the embodiments of the disclosure, and shall all be covered by the scope of protection of the disclosure. Therefore, the scope of protection of the disclosure shall be stated to be subject to the scope of protection of the claims.

What is claimed is:

1. A robot, comprising: a robot processor, an identifying component and a positioning component, wherein:
   the identifying component is configured to, in response to detecting positioning reference objects on both sides of the robot during movement of the robot, obtain distance information between the identifying component and the positioning reference object on each side, respectively, and send the distance information to the robot processor;
   the positioning component is configured to obtain first location information in response to the identifying component identifying the positioning reference objects, and send the first location information to the robot processor; and
   the robot processor is configured to determine position information of the positioning reference objects on both sides based on the received distance information to the positioning reference object on each side and the first location information, and determine middle position information between the positioning reference objects on both sides based on the position information of the positioning reference objects on both sides; determine a motion control parameter based on the middle position information and the first location information; and control, based on the motion control parameter, the robot to move according to the middle position information;
   wherein the identifying component comprises: a laser component, configured to emit detection laser to both sides based on preset angle information; and
   the robot processor is configured to: determine reference location information corresponding to the positioning reference object on each side based on the distance information, the preset angle information and the first location information; and determine the middle position information between the positioning reference objects on both sides based on the reference location information corresponding to the positioning reference object on each side;
   wherein the distance information comprises first distance information between the laser component and a first positioning reference object, and second distance information between the laser component and a second positioning reference object; the preset angle information comprises first angle information for identifying the first positioning reference object and second angle information for identifying the second positioning reference object; the reference location information comprises second location information of the first positioning reference object and third location information of the second positioning reference object; and
   the robot processor is configured to determine the second location information of the first positioning reference object based on the first distance information, the first angle information and distance information between the laser component and a center of the robot; determine the third location information of the second positioning reference object based on the second distance information, the second angle information and the distance information between the laser component and the center of the robot; and determine middle position information between the first positioning reference object and the second positioning reference object based on the second location information and the third location information.

2. The robot of claim 1, wherein the motion control parameter comprises: moving directions and moving distances; and the robot processor is configured to determine a moving distance and a moving direction of the robot on a horizontal axis based on a difference between a horizontal coordinate of the first location information and a horizontal coordinate of the middle position information; and determine a moving distance and a moving direction of the robot on a vertical axis based on a difference between a vertical coordinate of the first location information and a vertical coordinate of the middle position information.

3. A positioning method, comprising:

identifying, by an identifying component, positioning reference objects on both sides during movement, and obtaining distance information to the positioning reference object on each side respectively;

obtaining first location information in response to identifying the positioning reference objects;

determining position information of the positioning reference objects on both sides based on the distance information to the positioning reference object on each side and the first location information, and determining middle position information between the positioning reference objects on both sides;

determining a motion control parameter based on the middle position information and the first location information; and controlling a robot to move according to the middle position information based on the motion control parameter;

wherein the identifying component comprises: a laser component, configured to emit detection laser to both sides based on preset angle information; and determining the middle position information between the positioning reference objects on both sides based on the distance information to the positioning reference object on each side and the first location information, comprises:

determining reference location information corresponding to the positioning reference object on each side based on the distance information, the preset angle information and the first location information; and determining the middle position information between the positioning reference objects on both sides based on the reference location information corresponding to the positioning reference object on each side;

wherein the distance information comprises first distance information between the laser component and a first positioning reference object, and second distance information between the laser component and a second positioning reference object; the preset angle information comprises first angle information for identifying the first positioning reference object and second angle information for identifying the second positioning reference object; the reference location information comprises second location information of the first positioning reference object and third location information of the second positioning reference object; and determining the middle position information between the positioning reference objects on both sides based on the distance information to the positioning reference object on each side and the first location information, comprises:

determining the second location information of the first positioning reference object based on the first distance information, the first angle information and distance information between the laser component and a center of the robot;

determining the third location information of the second positioning reference object based on the second distance information, the second angle information and the distance information between the laser component and the center of the robot; and determining the middle position information between the first positioning reference object and the second positioning reference object based on the second location information and the third location information.

4. The method of claim 3, wherein the motion control parameter comprises:

moving directions and moving distances; and determining the motion control parameter based on the middle position information and the first location information, comprises:

determining a moving distance and a moving direction of the robot on a horizontal axis based on a difference between a horizontal coordinate of the first location information and a horizontal coordinate of the middle position information; and determining a moving distance and a moving direction of the robot on a vertical axis based on a difference between a vertical coordinate of the first location information and a vertical coordinate of the middle position information.

5. A robot, comprising: a robot processor, an identifying component and a positioning component, wherein:

the identifying component is configured to, in response to detecting positioning reference objects on both sides of the robot during movement of the robot, obtain distance information between the identifying component and the positioning reference object on each side, respectively, and send the distance information to the robot processor;

the positioning component is configured to obtain first location information in response to the identifying component identifying the positioning reference objects, and send the first location information to the robot processor; and the robot processor is configured to determine position information of the positioning reference objects on both sides based on the received distance information to the positioning reference object on each side and the first location information, and determine middle position information between the positioning reference objects on both sides based on the position information of the positioning reference objects on both sides; determine a motion control parameter based on the middle position information and the first location information; and control, based on the motion control parameter, the robot to move according to the middle position information;

wherein the identifying component comprises: a binocular camera component, and the distance information comprises third distance information between a first camera component and a first positioning reference object, fourth distance information between a second camera component and the first positioning reference object, fifth distance information between the first camera component and a second positioning reference object, and sixth distance information between the second camera component and the second positioning reference object;

the robot processor is configured to determine tenth distance information and third angle information based on the third distance information, the fourth distance information, seventh distance information between the first camera component and the second camera component, eighth distance information between the first camera component and a center of the robot, and ninth distance information between the second camera component and the center of the robot; determine fourth location information corresponding to the first positioning reference object based on the tenth distance information and the third angle information; determine eleventh distance information and fourth angle information based on the fifth distance information, the sixth distance information, the seventh distance information, the eighth distance information, and the ninth distance information; determine fifth location information corresponding to the second positioning reference object based on the eleventh distance information and the fourth angle information; and determine the middle position information between the positioning reference objects on both sides based on the fourth location information and the fifth location information.

6. The robot of claim 5, wherein the motion control parameter comprises: moving directions and moving distances; and the robot processor is configured to determine a moving distance and a moving direction of the robot on a horizontal axis based on a difference between a horizontal coordinate of the first location information and a horizontal coordinate of the middle position information; and determine a moving distance and a moving direction of the robot on a vertical axis based on a difference between a vertical coordinate of the first location information and a vertical coordinate of the middle position information.

* * * * *